Patented Nov. 29, 1938

2,138,413

UNITED STATES PATENT OFFICE 2,138,413

PROCESS OF PREPARING PHTHALOCYANINE PIGMENTS

Frank S. Turek, Yonkers, N. Y., assignor to Interchemical Corporation, a corporation of Ohio No Drawing. Application January 21, 1937,
Serial No. 121,568

8 Claims. (Cl. 260—314)

This invention relates to the process of preparing pigments of the class which has been called "phthalocyanines", by reacting phthalonitrile (orthodinitrile of benzene) with a metalliferous reactant. The metalliferous reactants commonly used are heavy metals and compounds of heavy metals.

This reaction has heretofore been carried out in the absence of solvents in which case a high heat, approximately 250° C. is required to effect the reaction. The reaction has also been carried out in the presence of the low boiling solvent, pyridine. This requires a closed vessel and the use of super-atmospheric pressures, as heat above the boiling point of the solvent pyridine must be applied in order to effect the reaction. It has also been proposed to carry out the reaction in the presence of certain high boiling solvents, but it has been found that in the presence of the solvents suggested the reaction is slow and unsatisfactory.

I have discovered a class of organic liquids which are solvents for phthalonitrile and which accelerate the reaction of phthalonitriles with metals and metallic compounds and at the same time permit a reduction of the reaction temperature. The acceleration of the reaction and the smoothness and completeness of the reaction in the presence of this class of liquids appears to indicate that they have some catalytic effect in the reaction but this I have been unable to determine definitely.

The class of organic liquids which I have found to have the above effects consists of aliphatic alcohols containing two or three OH groups and aliphatic alcohol-ethers containing not less than two ether groups, or more briefly, aliphatic di- and tri-hydric alcohols and alcohol-poly-ethers. Commercially available and inexpensive solvents in this group include glycerol, alkyl glycols like ethylene glycol, di- and tri-ethylene glycol and trimethylene glycol, and glycol ethers such as diethylene glycol monoethyl ether and diethylene glycol mono-butyl ether ("Carbitol" and butyl "Carbitol").

The solvents in this group are all water-soluble and all have a high polarity which may account for their apparent catalytic action.

The process which I have invented consists in dissolving phthalonitrile in a solvent of the group above specified, introducing a metalliferous reactant and then heating the mixture to a temperature which is both below 250° C. and as low as the boiling point of the solvent used, but sufficiently high to cause the dissolved phthalonitrile to react with the metalliferous reactant.

One feature of my invention consists in selecting a solvent from the di- and tri-hydric alcohols and using a reaction temperature below 170° C. This results in a pigment having a much finer particle size than those obtained by conducting the reaction at higher temperatures. When ethylene glycol is used as the solvent and copper is used as the metal, the reaction temperature is below 140° C., and the particle size of the resulting pigment is so fine that the pigment is ready for use without the sulphuric acid purification which is ordinarily necessary in pigments of this class in order to obtain a fine particle size.

Specific examples of my process are as follows:

Example I 41 grams of phthalonitrile (88% pure) are dissolved in 200 grams of ethylene glycol, and 5.3 grams of powdered metallic copper are mixed in the solution with good agitation. The mixture is then heated to 137° C. and maintained at a temperature of from 137° C. to 140° C. for a period of two hours.

The yield, after removing the solvent, is 33 grams, 80% of the theoretical yield. The product is a finely divided blue pigment in condition for use in paints, inks and the like.

Example II 41 grams of phthalonitrile (88% pure) are dissolved in 200 grams of trimethylene glycol, and 5.3 grams of powdered metallic copper are mixed in the solution with good agitation. The mixture is heated to a temperature of 165° C. and maintained at a temperature of from 165° C. to 170° C. for a period of one hour.

The yield, after removing the solvent, is 30 grams, or 73% of the theoretical yield. The product is a blue pigment having a particle size somewhat larger than that of Example I and is preferably subjected to the sulphuric acid purification treatment usual in pigments of this class.

Example III 41 grams of phthalonitrile (88% pure) are dissolved in 200 grams of butyl carbitol, and 5.3 grams of powdered metallic copper are mixed in the solution with good agitation. The solution is heated to 225° C. (which is the boiling point of butyl carbitol) and held at this temperature for 6½ hours.

The yield, after removing the solvent, is 37½ grams, or 91% of the theoretical yield. The product is a blue pigment having a particle size somewhat larger than that of Example II and is preferably subjected to the sulphuric acid purification treatment usual in pigments of this class.

In carrying out my method, a compound of copper may be substituted for metallic copper, or other metals may be used, such as tin, lead, cadmium, cobalt and the like which have heretofore been used as metalliferous reactants in the making of phthalocyanine pigments. Such reactants are inert to the solvents specified. For some metals, it is necessary to use a temperature as high a 165° C. to obtain the reaction when ethylene glycol is used as a solvent.

In carrying out my method, the liquid used as a solvent may consist of a single chemical compound selected from the group above specified or of a mixture of two or more chemical compounds contained in the group. Thus, it is sometimes desirable to use a mixture of ethylene glycol and diethylene glycol mono-butyl ether in which the ethylene glycol tends to accelerate the reaction and produce smaller particles than if diethylene glycol monobutyl ether were used alone.

What I claim is:

1. The process of making pigments which comprises reacting an aromatic ortho-dinitrile with a metalliferous reactant in the presence of liquid selected from the group which consists of alipathic di- and tri-hydric alcohols and alcohol-poly-ethers at a reaction temperature as low as the boiling point of the liquid, the metalliferous reactant being inert to the selected liquid.

2. The process of making phthalocyanine pigments which comprises reacting phthalonitrile with a metalliferous reactant in the presence of liquid selected from the group which consists of alipathic di- and tri-hydric alcohols and alcohol-poly-ethers at a reaction temperature as low as the boiling point of the liquid, the metalliferous reactant being inert to the selected liquid.

3. The process for the preparation of phthalocyanine pigments which comprises dissolving phthalonitrile in liquid selected from the group consisting of alipathic di- and tri-hydric alcohols and alcohol-poly-ethers, adding to the solution a metalliferous reactant inert to the selected liquid, and heating to a temperature as low as the boiling point of the solvent at which the phthalonitrile reacts with the metal compound.

4. The process of making phthalocyanine pigments which comprises reacting phthalonitrile with a metalliferous reactant in the presence of an alipathic di- or tri-hydric alcohol at a reacting temperature below 170° C., the metalliferous reactant being inert to the alcohol.

5. The process of making finely divided phthalocyanine pigments which comprises dissolving phthalonitrile in ethylene glycol, adding to the solution a metalliferous reactant inert to ethylene glycol, and heating the mixture to a temperature below 165° C. at which the phthalonitrile reacts with the metal or metallic compound.

6. The process of making a finely divided phthalocyanine pigment which comprises dissolving phthalonitrile in ethylene glycol, adding copper to the solution, and heating the mixture to a temperature below 140° C. at which the phthalonitrile reacts with the copper.

7. The process of making phthalocyanine pigments which comprises reacting phthalonitrile with a metalliferous reactant in the presence of an aliphatic alcohol-di-ether at a reaction temperature as low as the boiling point of the ether, the metalliferous reactant being inert to the ether.

8. The process of making phthalocyanine pigments which comprises dissolving phthalonitrile in diethylene glycol mono-butyl ether, adding copper to the solution and heating the mixture to the boiling point of the ether.

FRANK S. TUREK.